(12) United States Patent
Nakagawa et al.

(10) Patent No.: US 6,506,122 B2
(45) Date of Patent: Jan. 14, 2003

(54) CONSTANT VELOCITY UNIVERSAL JOINT

(75) Inventors: Toru Nakagawa, Iwata (JP); Kazuhiko Hozumi, Iwata (JP); Masazumi Kobayashi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/852,147

(22) Filed: May 10, 2001

(65) Prior Publication Data

US 2002/0022528 A1 Feb. 21, 2002

(30) Foreign Application Priority Data

May 19, 2000 (JP) ..................................... 2000-148403
Jun. 19, 2000 (JP) ..................................... 2000-183172
Jun. 27, 2000 (JP) ..................................... 2000-193117

(51) Int. Cl.$^7$ .............................................. F16D 3/223
(52) U.S. Cl. ........................................ 464/145; 464/906
(58) Field of Search ................................ 464/145, 906, 464/139, 143, 141

(56) References Cited

U.S. PATENT DOCUMENTS

| | | | | |
|---|---|---|---|---|
| 4,820,240 A | * | 4/1989 | Girguis ........................ 464/145 |
| 4,846,764 A | * | 7/1989 | Hazebrook et al. ......... 464/145 |
| 4,878,882 A | * | 11/1989 | Welschof et al. ............ 464/145 |
| 4,915,672 A | * | 4/1990 | Girguis ........................ 464/145 |
| 5,501,639 A | * | 3/1996 | Krude ......................... 464/145 |
| 5,509,855 A | * | 4/1996 | Wormbsacher et al. ...... 464/145 |
| 5,509,856 A | * | 4/1996 | Welschof .................... 464/145 |
| 5,609,527 A | * | 3/1997 | Fuerstenau et al. ......... 464/145 |
| 5,853,328 A | * | 12/1998 | Kobayashi et al. ......... 464/145 |
| 5,944,612 A | * | 8/1999 | Schwarzler .................. 464/145 |
| 6,120,382 A | * | 9/2000 | Sone et al. .................. 464/145 |
| 6,299,542 B1 | * | 10/2001 | Ouchi et al. ................. 464/145 |
| 6,368,223 B1 | * | 4/2002 | Ouchi et al. ................. 464/145 |

* cited by examiner

*Primary Examiner*—Lynne H. Browne
*Assistant Examiner*—Kenn Thompson
(74) *Attorney, Agent, or Firm*—Arent Fox Kintner Plotkin & Kahn, PLLC (57) ABSTRACT

Each pocket of a cage is composed of a pair of axial wall surfaces opposing each other along the axial line of the cage, a pair of circumferential wall surfaces opposing each other along the circumference direction of the cage, and radii linking the axial wall surfaces and circumferential wall surface. A ratio (R/d) of the radius of curvature R of the radii to the diameter d of the torque transmitting balls is set within a range 0.45 R/d 0.62. Also, the circumferential wall surfaces and radii are shaped along an arc having the radius of curvature R. Further, as to the axial wall surfaces, variance in the treatment margin is lessened by applying the grinding, hardened steel cutting, or the like after the heat treatment (carburized hardening and tempering) is applied to the cage.

18 Claims, 10 Drawing Sheets

CONSTANT VELOCITY UNIVERSAL JOINT

BACKGROUND OF THE INVENTION

The present invention relates to a constant velocity universal joint capable of transmitting rotary torqe at a constant velocity whatever angles of the driving shaft and driven shaft may take. The constant velocity universal joints are roughly classified into the fixed type constant velocity universal joint that allows only an angular displacement between two axes and the plunging type constant velocity universal joint that allows an angular displacement and an axial displacement between two axes, and the present invention relates to the former fixed type constant velocity universal joint. The constant velocity universal joint of the present invention is suitable for use in connecting the drive shatt of an automobile, for example.

The connection structure of the drive shaft of an automobile varies with the suspension method of the vehicle. For example, in case of an automobile adapting the independent suspension method, the differential is provided to the car body, and the both ends of the drive shaft are connected to the differential and the axle through the universal joints, respectively. In order to permit the drive shaft to make a suspension-associated displacement, it is arranged such that the angular displacement of the drive shaft is allowed at the connection on the wheel-associated side, and the angular displacement and axial displacement of the drive shaft are allowed at the connection on-the differential-associated side.

As the above universal joint, the constant velocity universal joint is used most popularly, and the fixed type constant velocity universal joint, such as the Zepper type, that allows only the angular displacement between two axes is used at the connection on the wheel-associated side, and the plunging type constant velocity universal joint, such as the double offset type, tripod type, and cross groove type, that allows the angular displacement and axial displacement between two axes is used at the connection on the differential-associated side.

Figure 10A:
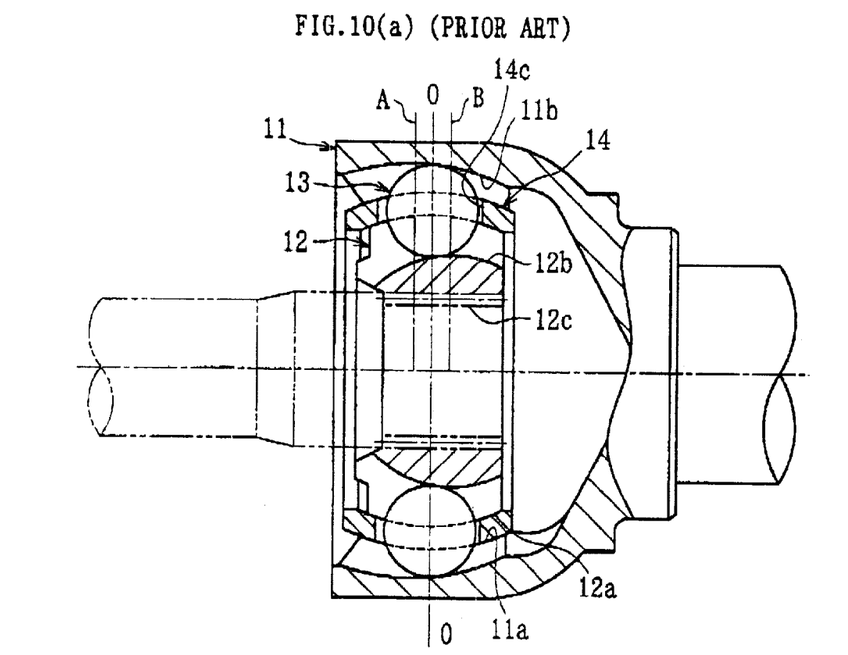
FIGS. 10(a) and 10(b) are longitudinal sectional views of a conventional constant velocity universal joint.
Figure 10B:
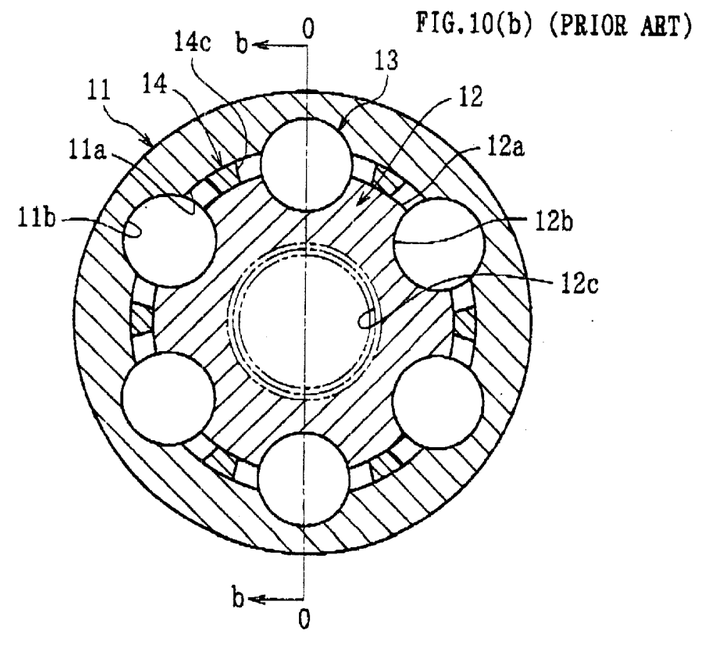

FIGS. 10($a$) and 10($b$) are views showing a fixed type constant velocity universal joint (RZEPPA type constant velocity universal joint: ball fixed joint) that has been used as connecting joint of the drive shaft of an automobile or the like. This constant velocity universal joint includes an outer joint member 11 having a spherical inner surface 11$a$ axially formed with six curved guide grooves 11$b$, an inner joint member 12 having a spherical outer surface 12$a$ axially formed with six curved guide grooves 12$b$ and an inner surface formed with a fitting portion 12$c$ having a tooth profile (serrations or splines), six torque transmitting balls 13 disposed in six ball tracks defined between the guide grooves 11$b$ in the outer joint member 11 and the guide grooves 12$b$ in the inner joint member 12 corresponding thereto, and a cage 14 having window-like pockets 14$c$ for retaining the torque transmitting balls 13.

The centers A and B of the guide grooves 11$b$ and 12$b$ of the outer and inner joint members 11 and 12, respectively, are offset axially with respect to the spherical centers of the inner and outer surfaces 11$a$ and 12$a$, respectively, by an equal distance in opposite directions (in case of the example shown in the same drawing, the center A is offset toward the open side of the joint, and the center B toward the inner side of the joint). As a result, the ball track defined between the guide groove 11$b$ and the guide groove 12$b$ corresponding thereto is wedge-wise enlarged in one sense of the axial direction (in case of the example shown in the same drawing, toward the open side of the joint). The spherical centers of the inner and outer surfaces 11$a$ and 12$a$ of the outer and inner joint members 11 and 12, respectively, are located in the joint center plane O including the centers of the torque transmitting balls 13.

When the outer and inner joint members 11 and 12 make an angular displacement of angle θ, the torque transmitting balls 13 guided by the cage 14 are maintained in the bisector plane (θ/2) bisecting the angle θ at any operating angle θ so that the uniformity of velocity for the joint is secured.

With the ball fixed type constant velocity universal joint of this type, it is important how an axial clearance between the pockets of the cage and the torque transmitting balls should be determined. In other words, if the interference (negative clearance) between the pockets of the cage and the torque transmitting balls is too large, so is a force of constrain on the torque transmitting balls, thereby inhibiting the smooth roiling movement of the torque transmitting balls. This causes sliding at a contact portion between the torque transmitting balls and ball tracks during the joint-associated rolling movement of the torque transmitting balls, and the sliding causes a temperature inside the joint to rise, which results in one of the factors to shorten the service life. On the contrary, when the play (positive clearance) between the pockets of the cage and the torque transmitting balls is too large, hammering occurs between the pockets and torque transmitting balls or the vibrations of the joint increase as undesirable influence from the functional viewpoint of the joint. Also, the axial wall surfaces of the pockets wear out by physical contact with the torque transmitting balls. Hence, the positive clearance that was adequate at the beginning of the use may become too large during the use. Further, the dimension of each component has inevitable dimensional variation within the manufacturing tolerance. Thus, in view of the foregoing, with the above-discussed conventional constant velocity universal joint (6-ball fixed type constant velocity universal joint), the axial initial clearance between the pockets of the cage and the torque transmitting balls is set within a range −50 to −10 $\mu$M.

Figure 11A:
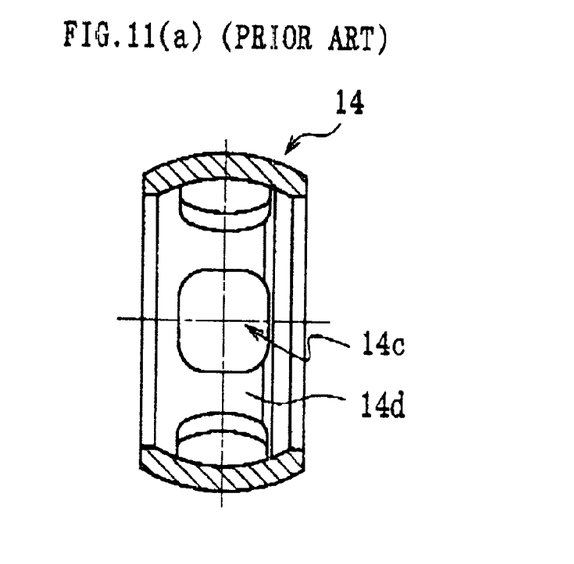
FIG. 11(a) is a longitudinal sectional view of a cage in the conventional constant velocity universal joint.
Figure 11B:
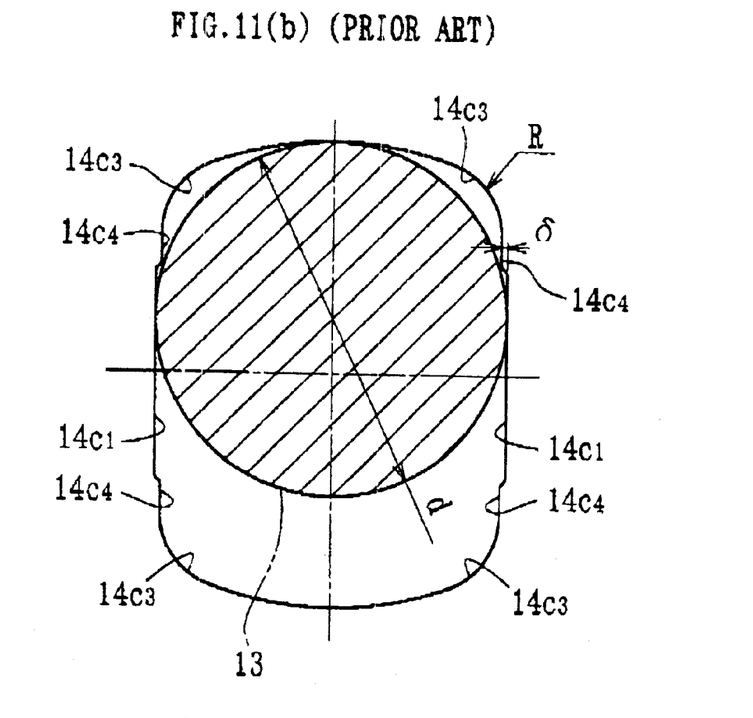
FIG. 11(b) is an enlarged plan view showing a peripheral portion of each pocket.

FIGS. 11($a$) and 11($b$) are views showing the cage 14 in the above-discussed constant velocity universal joint. The cage 14 is provided with six circumferentially equispaced window-like pockets 14$c$ for retaining the torque transmitting balls 13. Both of the circumferential sides of each pocket 14$c$ form column portions 14$d$. Conventionally, the pockets 14$c$ of the cage 14 are formed by means of punching press and finished with shaving (broaching) on a pair of axial wall surfaces 14$c$1 (see FIG. 11($b$)) opposing each other along the axial line. In this case, the axial initial clearance between the pockets 14$c$ and torque transmitting balls 13 is set within a range −50 to −10 $\mu$m by applying the treatment on the axial wall surfaces 14$c$1. However, if the treatment margin on the axial wall surfaces 14$c$1 has variance, the center position of the pockets 14$c$ varies with each of the circumferentially aligned pockets 14$c$, that is, a so-called pockets staggering state occurs, which reduces the strength and durability of the cage 14. In order to prevent the occurrence of the so-called pockets staggering state, a small radius of curvature R is given to each radius (rounded corner) 14$c$3 of the pockets 14$c$ to secure linear portions 14$c$4, so that an axial dimension δ between the axial wall surfaces 14$c$1 and linear portions 14$c$4 can be controlled. Thus, because the radius of curvature R of the radii 14$c$3 is lessened, a space of the pockets is expanded comparably and occupies an unnecessary portion from the functional viewpoint.

On the other hand, the applicant of the present invention has already proposed a ball fixed type constant velocity universal joint having eight ball tracks and eight torque transmitting balls disposed therein to realize a more compact and lightweight constant velocity universal joint while securing the strength, load capacity, and durability which are at least as high as those of the conventional constant velocity universal joint (6-ball fixed type constant velocity universal joint) shown in FIGS. 10(a) and 10(b) (WO97/24538, U.S. Pat. No. 6,120,382). The constant velocity universal joint in accordance with this proposal has a different basic structure from the above-discussed conventional constant velocity universal joint (6-ball fixed type constant velocity universal joint), and it is assumed that a unique and optimal value tor the structure is set as the axial initial clearance. Also, with the constant velocity universal joint in accordance with this proposal, the outer dimension of the outer joint member is reduced compared with that of the above-discussed conventional constant velocity universal joint (6-ball fixed type constant velocity universal joint), and so is the cross section of the peripheral portions of the pockets of the cage. Thus, if the conventional structure of the pockets of the cage is adapted directly, the space of the pockets becomes too large from the functional viewpoint, which increases the stress on the column portions of the cage and reduces the surface areas of the inner and outer surfaces. Consequently, there may be a case that the strength and durability of the cage are not secured in a satisfactory manner.

SUMMARY OF THE INVENTION

An object of the present invention is to further improve durability of a constant velocity universal joint having eight ball tracks and eight torque transmitting balls disposed therein by setting an optimal axial initial clearance between the pockets of the cage and the torque transmitting balls with consideration given to the function of the joint.

Another object of the present invention is to improve strength and durability of the cage, and hence strength and durability of the joint in a constant velocity universal joint having eight ball tracks and eight torque transmitting balls disposed therein by optimizing the structure of the pockets without impairing the function of the cage.

Still another object of the present invention is to make a constant velocity universal joint having eight ball tracks and eight torque transmitting balls disposed therein more lightweight, compact, and economical with consideration given to the strength, load capacity, durability, and high angularity of the joint.

In order to achieve the above and other objects, a first aspect of the present invention provides a constant velocity universal joint including: an outer joint member having eight axially extending curved guide grooves formed in a spherical inner surface thereof; an inner joint member having eight axially extending curved guide grooves formed in a spherical outer surface thereof; eight torque transmitting balls disposed in eight ball tracks defined between the guide grooves in the outer joint member and the guide grooves in the inner joint member corresponding thereto; and a cage having pockets for retaining the torque transmitting balls, respective centers of the guide grooves in the outer and inner joint members, respectively, being offset axially with respect to respective spherical centers of the inner and outer surfaces by an equal distance (F) in opposite directions, wherein an axial initial clearance between the pockets of the cage and the torque transmitting balls is within a range −30 to +10 μm.

The constant velocity universal joint in accordance with the first aspect of the invention has eight torque transmitting balls, and compared with the conventional joint (6-ball fixed type constant velocity universal joint), a ratio of the load supported by one torque transmitting ball to the entire load capacity on the joint is small. For this reason, a contact stress between the pocket wall surfaces of the cage and torque transmitting balls when the joint transmits rotary torque at an operating angle is lessened compared with that of the conventional joint (6-ball fixed type constant velocity universal joint), and so is an amount of wear on the pocket wall surfaces of the cage. Also, because an amount of wear on the pocket wall surfaces of the cage is lessened, a value of an axial initial clearance can be shifted comparably to the plus side from that of the conventional joint (6-ball fixed type constant velocity universal joint) without causing a problem that the clearance will become a too large positive clearance during use, thereby making it possible to maintain the function of the joint. On the other hand, by shifting the value of the axial initial clearance to the plus side, a force of constraint on the torque transmitting balls by the pockets of the cage is lessened, and the smooth rolling movement of the torque transmitting balls can be secured. As a result, less heat is yielded at the contact portion between the torque transmitting balls and ball tracks, and a rise in temperature inside the joint is reduced, thereby improving the durability of the joint. From the results of a great many tests, it has been confirmed that by setting the axial initial clearance between the pockets of the cage and the torque transmitting balls within a range −30 to +10 μm, and more preferably within a range −10 to +10 μm, it is possible to prevent the axial clearance between the pockets of the cage and the torque transmitting balls from becoming too large or too small, and as a result, the durability can be improved while securing the function of the joint.

Also, a second aspect of the present invention provides a constant velocity universal joint including: an outer joint member having eight axially extending curved guide grooves formed in a spherical inner surface thereof; an inner joint member having eight axially extending curved guide grooves formed in a spherical outer surface thereof; eight torque transmitting balls disposed in eight ball tracks defined between the guide grooves in the outer joint member and the guide grooves in the inner joint member corresponding thereto; and a cage having pockets for retaining the torque transmitting balls, respective centers of the guide grooves in the outer and inner joint members, respectively, being offset axially with respect to respective spherical centers of the inner and outer surfaces by an equal distance (R) in opposite directions, each of the guide grooves in the outer and inner joint members being provided with a straight portion having a linear groove bottom, wherein an axial initial clearance between the pockets of the cage and the torque transmitting balls is within a range −30 to +10 μm, and more preferably within a range −10 to +10 μm.

The constant velocity universal joint in accordance with the second aspect of the invention is provided with the straight portion having the linear groove bottom in each of the guide grooves in the outer and inner joint members. Hence, compared with the constant velocity universal joint in accordance with the first aspect of the invention, the constant velocity universal joint in accordance with the second aspect of the invention is characterized in that it can take a larger operating angle. The other characteristics are the same as those of the constant velocity universal joint in accordance with the first aspect of the invention. In the above arrangement, the cage may be provided with a surface hardened layer and a core portion, and the surface hardened layer may have a surface hardness of HRC58 to 63 while the core portion may have a hardness of HRC35 to 45. Here, HRC represents hardness in the Rockwell C scale. The surface hardened layer is, for example, a carburized layer formed by means of carburization. It is desirable that, at least in a cross section of column portions positioned between the pockets of the cage, an area ratio of the core portion to an entire area is 40 to 55%. According to this arrangement, the cage is provided with the surface layer having excellent wear resistance, and the core portion having excellent toughness. Consequently, the cage has an outstanding contact fatigue life, a high cracking strength, etc.

In the above arrangement, it is desirable to set an amount (F) of the offset to 2 to 4 mm at the respective centers of the guide grooves in the outer and inner joint members. By providing the offset to the guide grooves, the depth of the guide grooves becomes uneven in the axial direction. For this reason, if an amount (F) of the offset is too large, it is predicted that a contact oval at a contact portion between the guide grooves and torque transmitting balls goes beyond the guide grooves when the torque transmitting balls transmit a high load (when an operating angle is large) where the depth of the grooves is small. However, by setting an amount (F) of the offset to 2 to 4 mm, it is possible to prevent the contact oval from going beyond the grooves, and forestall the resulting chipping of the shoulder portion of the guide grooves, thereby making it possible to improve the strength and durability of the outer and inner joint members. In additions because it is also possible to increase the thickness of the cage, the strength and durability of the cage can be improved as well.

Also, in order to achieve the above and other objects, a third aspect of the invention provides a constant velocity universal joint including: an outer joint member having eight axially extending curved guide grooves formed in a spherical inner surface thereof; an inner joint member having eight axially extending curved guide grooves formed in a spherical outer surface thereof; eight torque transmitting balls disposed in eight ball tracks defined between the guide grooves in the outer joint member and the guide grooves in the inner joint member corresponding thereto; and a cage having eight window-like pockets for retaining the torque transmitting balls, the ball tracks being wedge-wise enlarged toward one sense of an axial direction, wherein each of the pockets of the cage includes radii, and given R as a radius of curvature of the radii, and d as a diameter of the torque transmitting balls, then a ratio (R/d) is R/d≧0.22, and more preferably within a range 0.45 R/d 0.62.

Figure 7:
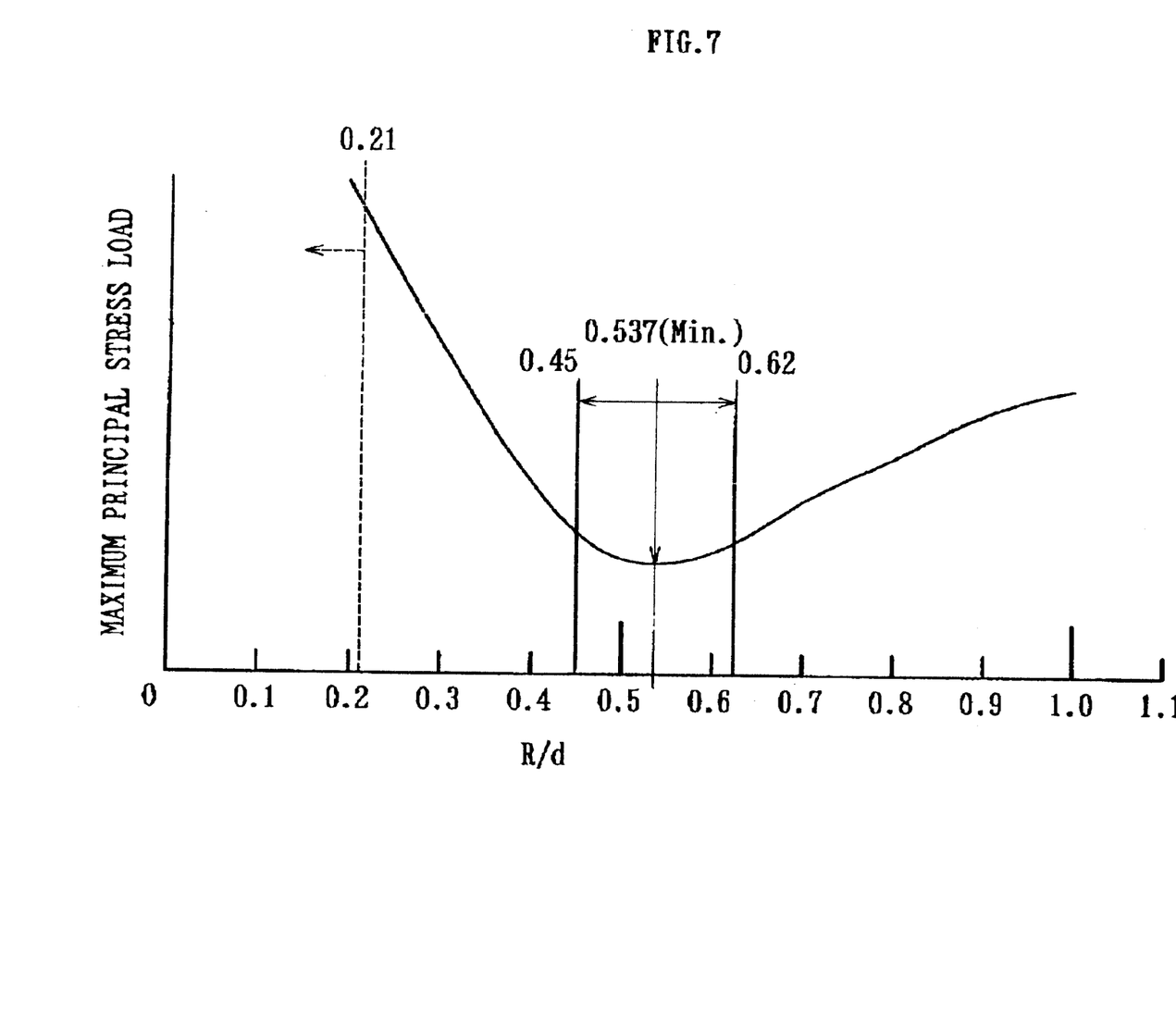
FIG. 7 is a view showing a relation of a ratio (R/d) versus maximum principal stress load on column portions.

The reason why the ratio (R/d) is set within the above-specified range is as follows. FIG. 7 is a view showing a result when a relation of the ratio (R/d) versus a maximum principal stress load applied on the column portions (intervals between the circumferentially adjacent pockets of the cage) was found by means of FEM analysis. FIG. 7 reveals that the {(R/d)—(maximum principal stress load)} diagram takes the minimum value when R/d=0.537, and the maximum principal stress load on the column portions reaches its theoretical lowest value when R/d=0.537. Also, as is set forth in Table 1, the R dimension that satisfies R/d=0.537 was found for each size of the torque transmitting balls with reference to the above analysis result. Further, given with ±1 mm as the general tolerance of the R dimension (general tolerance: tolerance of ±1 mm given to the R dimension over 6 mm in the basic dimension), the lower limit value and upper limit value of the R dimension were found, and the corresponding lower limit value and upper limit value of the R/d were found (the median value of the R/d is an average of the upper limit value and lower limit value). Then, a range 0.45 R/d 0.62 was obtained as a preferable range of R/d. On the other hand, in case of the conventional cage shown in FIGS. 11(a) and 11(b), R/d=0.21, and hence, if R/d≧0.22, it is expected to achieve an effect of reducing the maximum principal stress load. For the reason discussed above, the ratio (R/d) is set to R/d≧0.22, and more preferably within a range 0.45 R/d 0.62. Also, by setting the ratio (R/d) to the above- specified range, it is possible to reduce a space of the pockets as small as possible, and in turn, increase the surface area of the inner surface and outer surface of the cage without impairing the function of the cage (operability with respect to the torque transmitting balls). Consequently, together with the effect of reducing the maximum principal stress load on the column portions, the strength and durability of the cage can be improved.

Also, a fourth aspect of the invention provides a constant velocity universal joint including: an outer joint member having eight axially extending curved guide grooves formed in a spherical inner surface thereof; an inner joint member having eight axially extending curved guide grooves formed in a spherical outer surface thereof; eight torque transmitting balls disposed in eight ball tracks defined between the guide grooves in the outer joint member and the guide grooves in the inner joint member corresponding thereto; and a cage having eight window-like pockets for retaining the torque transmitting balls, the ball tracks being wedge-wise enlarged toward one sense of an axial direction, each of the guide grooves in the outer and inner joint members being provided with a straight portion having a linear groove bottom, wherein each of the pockets of the cage includes radii, and given R as a radius of curvature of the radii, and d as a diameter of the torque transmitting balls, then a ratio (R/d) is R/d≧0.22, and more preferably within a range 0.45 R/d 0.62. The constant velocity universal joint in accordance with the fourth aspect of the invention is provided with the straight portion having the linear groove bottom in each of the guide grooves in the outer and inner joint members. Hence, compared with the constant velocity universal joint in accordance with the third aspect of the invention, the constant velocity universal joint in accordance with the fourth aspect of the invention is characterized in that it can take a larger operating angle. The other characteristics are the same as those of the constant velocity universal joint in accordance with the third aspect of the invention.

With the constant velocity universal joints of the present invention, the torque transmitting balls are incorporated in the following manner. That is, the outer joint member is angularly displaced relatively with respect to the inner joint member, and the torque transmitting balls are incorporated into the pockets of the cage and the ball tracks while facing the pockets of the cage outward through one of the openings of the outer joint member. When the outer and inner joint members make a relative angular displacement, the torque transmitting balls retained in the pockets of the cage move relatively in the circumferential direction. Thus, in order to incorporate the torque transmitting balls (the angle of displacement between the outer and inner joint members during incorporation of the torque transmitting balls is referred to as the ball incorporation angle), it is necessary to set the circumferential length of the pockets of the cage in such a manner that the previously incorporated torque transmitting balls will not interfere with the circumferential wall surfaces of the pockets of the cage as they move relatively in the circumferential direction. Also, an amount of relative circumferential movement of the torque transmitting balls in the pockets reaches its maximum at the phase angle of 45°, 135°, 225°, and 315°, respectively, and decreases to 0 (nil)

at the phase angle of 0°, 90°, 180°, and 270°, respectively. In view of the foregoing, it may be arranged such that the eight pockets of the cage are composed of first pockets and second pockets having different circumferential lengths from each other, and the first pockets having a shorter circumferential length are spaced apart from each other at a distance of one of 90° and 180°. The second pockets having the longer circumferential length are arranged so as to have a length such that the torque transmitting balls do not interfere with the circumferential wall surfaces of the pockets even when the torque transmitting balls move relatively by the maximum amount of the movement within the pockets during the incorporation of the torque transmitting balls. The first pockets having the shorter circumferential length is arranged so as to have a length such that the torque transmitting balls do not interfere with the circumferential wall surfaces of the pockets even when the torque transmitting balls move relatively by the maximum amount of the movement within the pockets if the joint takes the greatest operating angle (the largest angle of displacement which can be taken by the joint while performing the function as the joint). Consequently, the surface area of the inner surface and outer surface of the cage can be increased while securing the incorporating property of the torque transmitting balls and the function of the joint, thereby making it possible to improve the strength and durability of the cage.

Alternatively, it may be arranged such that the same circumferential length is given to all of the eight pockets of the cage. Because the strength and durability of the cage can be improved by setting the ratio (R/d) within the above-specified range, it is also possible to make the circumferential lengths of the eight pockets of the cage all equal (as long as the second pockets).

It is preferable that, of all wall surfaces of each pocket of the cage, at least a pair of axial wall surfaces opposing each other along an axial line of the cage are formed by means of cutting after heat treatment is applied to the cage. The cutting referred to herein includes the grinding, hardened steel cutting, etc. Consequently, the treatment margin on the axial wall surfaces can be lessened. Hence, it is possible to omit a linear portion provided to the conventional pockets structure in controlling the treatment margin on the axial wall surfaces, and instead, the ratio (R/d) can be set within the above-specified range by giving a larger radius of curvature to the radii.

Also, in order to achieve the above and other objects, a fifth aspect of the invention provides a constant velocity universal joint including: an outer joint member having eight axially extending curved guide grooves formed in a spherical inner surface thereof; an inner joint member having eight axially extending curved guide grooves formed in a spherical outer surface thereof, and a fitting portion formed with a tooth profile in an inner surface thereof to be fitted to an axis portion by the tooth profile thereof; eight torque transmitting balls disposed in eight ball tracks defined between the guide grooves in the outer joint member and the guide grooves in the inner joint member corresponding thereto; and a cage for retaining the torque transmitting balls, wherein: the ball tracks are wedge-wise enlarged toward one sense of an axial direction; and given W as an axial width of the inner joint member, and PCR as a length of a line segment linking a center of the guide grooves in the inner joint member and centers of the torque transmitting balls, then a ratio Rw (=W/PCR) is within a range 0.69 RW 0.84.

Here, the axial width (W) of the inner joint member uses the axial dimension of the guide grooves in the inner joint member as the reference.

The reason for selection of the range 0.69 Rw 0.84 is as follows.

In case that the number of the ball tracks and the number of the torque transmitting balls are both eight, the circumferential width (L: the circumferential dimension of the outer surface of the guide grooves, nee FIGS. 8(a) and 8(b) and 9(a) and 9(b)) of the outer surface of the inner joint member becomes relatively small compared with that of the conventional joint (6-ball fixed constant velocity universal joint) shown in FIGS. 10(a) and 10(b). Further, the smallest value of the circumferential dimension (L) of the outer surface varies with the axial width (W) of the inner joint member (the circumferential width (L) is not uniform along the axial direction, and decreases gradually from the center to the end portions along the axial direction, and reaches its smallest value at the end portions). Hence, the larger the axial width (W) of the inner joint member, the more the smallest value of the circumferential dimension (L) of the outer surface is reduced. On the other hand, in case that the inner joint member is preformed by means of forging, if the smallest value of the circumferential width (L) of the outer surface is too small, the materials do not flow in a satisfactory manner within the mold, which reduces a degree of accuracy of the guide grooves and outer surface. Also, the service life of the mold is shortened. It has been confirmed from the result of the test that there is a smallest value (δ: this varies with the joint size) of the circumferential width (L) of the outer surface such that can attain satisfactory degree of molding accuracy and service life of the mold, and it is necessary to set the axial width (W) of the inner joint member within a dimension such that can secure the smallest value (δ).

Figure 9A:
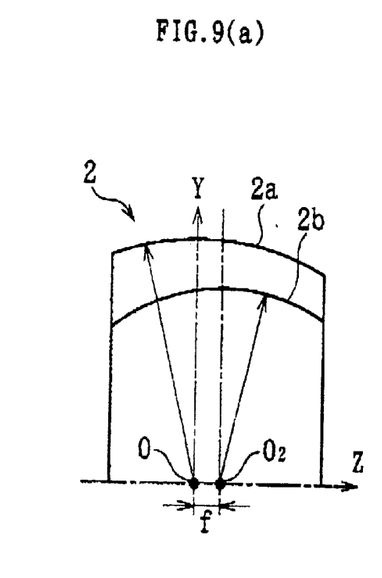
FIGS. 9(a) and 9(b) are views showing a geometrical model of the inner joint member.
Figure 9B:
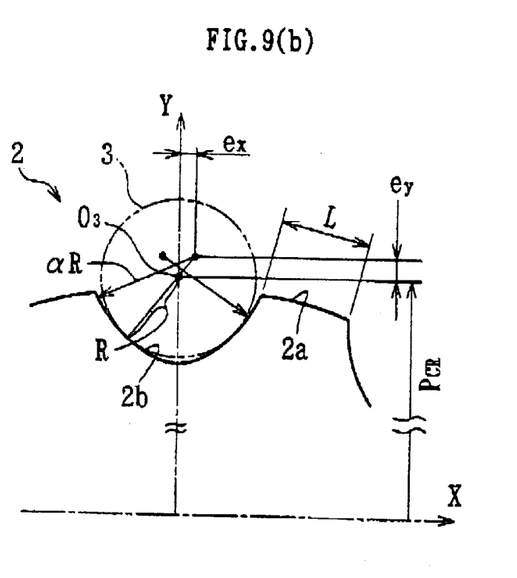

More specifically, from the geometrical relation shown in FIGS. 9(a) and 9(b), the coordinate at the boundary (shoulder portion) of the outer surface 2a and the guide groove 2b of the inner joint member 2 can be found by solving the following two equations (the chamfers of the shoulder portion and end surface are not concerned):

Equation of the guide groove surface:

$$(X+e_X)^2+\{(Y^2+Z^2)^{1/2}-(PCR+e_Y)\}^2=(\alpha R)^2$$

Equation of the outer surface:

$$X^2+Y^2+(Z-f)^2=R$$

Where X, Y, X; coordinates

PCR: the length of a line segment linking the center O2 of the guide grooves 2b and the centers O3 of the torque transmitting balls 3

$e_X$: an amount of the offset from the center of PCD at the center of the arc of the guide groove 2b $e_r$: an amount of the offset from the center of PCD at the center of the arc of the guide groove 2b α: a ratio of contact f: an amount of the offset from the center O2 of the guide grooves 2b R: the radius of the torque transmitting balls 3.

The circumferential width (L) of the outer surface is found by the above two equations, and then the axial width (W1) of the inner joint member such that satisfies the condition L=δ at the end portions is found. Because of the reason discussed above, in order to improve the forging property of the inner joint member, the axial width (W) has to satisfy the condition W W1. Also, by satisfying this condition, the weight, the axial dimension, and material costs of the inner joint member can be reduced.

Then, in order to determine the axial width (W) of the inner joint member, an axial relative movement of the torque transmitting balls with respect to the guide grooves at the angular displacement has to be concerned. In other words, it is desirable to make the axial width (W) of the inner joint member as small as possible provided that the condition W W1 is satisfied for the reason described above. However, if the axial width (W) is lessened more than necessary, a contact oval of the torque transmitting balls and the guide grooves in the inner joint member goes beyond the guide grooves at the angular displacement. This causes local concentration of the stress, and the occurrence of uneven wear or chipping of the guide grooves is concerned. Hence, in order to secure the strength and durability of the inner joint member, the threshold (W0) of the axial width (W) of the inner joint member is found, so that the contact oval of the torque transmitting balls and guide grooves will not go beyond the guide grooves even when the joint takes the greatest operating angle, and the axial width (W) is set so as to satisfy the condition W≧W0. The greatest operating angle is the largest angle of displacement which can be taken by the joint while performing the function as the joint, and the practical operating angle is generally set within a range smaller than the greatest operating angle.

Accordingly, an optimal range of the axial width (W) of the inner joint member is W0 W W1. It should be appreciated, however, that values of (W0) and (W1) vary with the joint sizes, and in order to attain more general standard, the range should be found in relation to the joint sizes and associated basic dimensions. In addition, (W0) varies with the greatest operating angle. Hence, from the viewpoint of achieving the high angularity of the joint, the greatest operating angle is set to 47°, and (W0) and (W1) are found for each joint size, and then a ratio Rw (=W/PCR) of the axial width (W) and the length (PCR) of a line segment linking the center of the guide grooves and the centers of the torque transmitting balls disposed therein is found. Accordingly, a condition of 0.69 Rw 0.84 is found, and it is discovered that the above condition is the reference for the optimal range of the axial width (W) of the inner joint member.

Also, a sixth aspect of the invention provides a constant velocity universal joint including: an outer joint member having eight axially extending curved guide grooves formed in a spherical inner surface thereof; an inner joint member having eight axially extending curved guide grooves formed in a spherical outer surface thereof, and a fitting portion formed with a tooth profile in an inner surface thereof to be fitted to an axis portion by the tooth profile thereof; eight torque transmitting balls disposed in eight ball tracks dtefined between the guide grooves in the outer joint member and the guide grooves in the inner joint member corresponding thereto; and a cage for retaining the torque transmitting balls, wherein: the ball tracks are wedge-wise enlarged toward one sense of an axial direction; each of the guide grooves in the outer and inner joint members is provided with a straight portion having a linear groove bottom; and given W as an axial width of the inner joint member, and PCR as a length of a line segment linking a center of the guide grooves in the inner joint member and centers of the torque transmitting balls, then a ratio Rw (=W/PCR) is within a range 0.80 Rw 0.93.

Here, the range 0.80 Rw 0.93 is found with the same reference in finding the range of Rw in the constant velocity universal joint in accordance with the fifth aspect of the invention. It should be noted, however, that the constant velocity universal joint in accordance with the six aspect of the invention is provided with the straight portion having a linear groove bottom in each of the guide grooves in the outer and inner joint members, and this makes it possible to make the greatest operating angle larger compared with the constant velocity university joint in accordance with the fifth aspect of the invention. Hence, from the viewpoint of achieving the high angularity of the joint, the greatest operating angle, which is used as the reference when determining the lowest value of Rw, is set to 50°.

As has been discussed, by setting the axial width (W) of the inner joint member within a range 0.69 Rw 0.84, the contact oval of the torque transmitting balls and guide grooves does not go beyond the guide grooves even when the joint takes the greatest operating angle of 47°, thereby making it possible to secure the strength and durability of the inner joint member, and hence the strength, durability, load capacity, and high angularity of the joint. At the same time, the treatment cost can be saved by improving the forging property of the inner joint member, and the weight, axial dimension, and material costs of the joint can be reduced by making the axial width (W) as small as possible. Further, with the arrangement such that each of the guide grooves in the outer and inner joint members is provided with the straight portion having a linear groove bottom, the above-discussed effects can be attained even when the greatest operating angle of the joint is set to as high as 50°. In particular, because the high operating angle is allowed, there can be attained an effect that the mountability of the joint onto an automobile can be improved.

In the above arrangement, given $PCD_{BALL}$ as a pitch circle diameter of the torque transmitting balls and d as a diameter thereof, then a ratio r1 (=$PCD_{BALL}$/d) may be within a range 3.3 r1 5.0. The reason for selection of the range 3.3 r1 5.0 is to secure the strength of the outer joint member or the like and the load capacity and durability of the joint which are at least as high as those of the conventional joint (6-ball fixed type constant velocity university joint). In other words, with the constant velocity universal joint, it is quite difficult to drastically change the pitch circle diameter ($PCD_{BALL}$) of the torque transmitting balls within a limited space. Thus, the value of r1 depends mainly on the diameter (d) of the torque transmitting balls. If r1<3.3 (mainly when the diameter d is large), the other components (outer joint member, inner joint member, etc.) would be too thin, and a concern is raised as to the strength. Conversely, if r1>5.0 (mainly when the diameter d is small), the load capacity would be too small, and a concern is raised as to the durability. Also, the surface pressure on the contact portion between the torque transmitting balls and guide grooves would increase (because the contact oval at the contact portion decreases with the decreasing diameter d), a concern is raised as to the chipping of the shoulder portion of the guide grooves.

By setting the range 3.3 r1 5.0, however, it is possible to secure the strength of the outer joint member or the like and the load capacity and durability of the joint which are at least as high as those of the conventional joint. It is more preferable to set the ratio r1 within a range 3.5 r1 5.0.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings.

DETAILED DESCRIPTION OF THE PREFERRED EMBODIMENT

Embodiments of the present invention will be described below with reference to the drawings.

Figure 1:
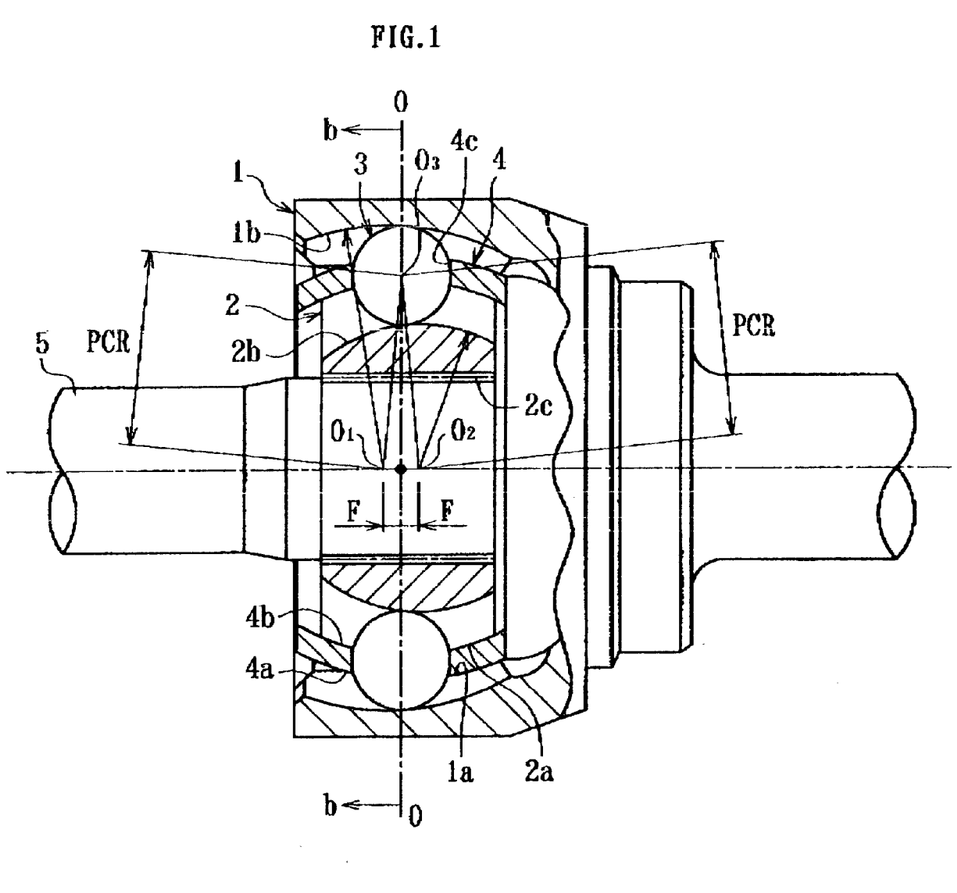
FIG. 1 is a longitudinal sectional view or a constant velocity universal joint in accordance with a first embodiment of the present invention.
Figure 2:
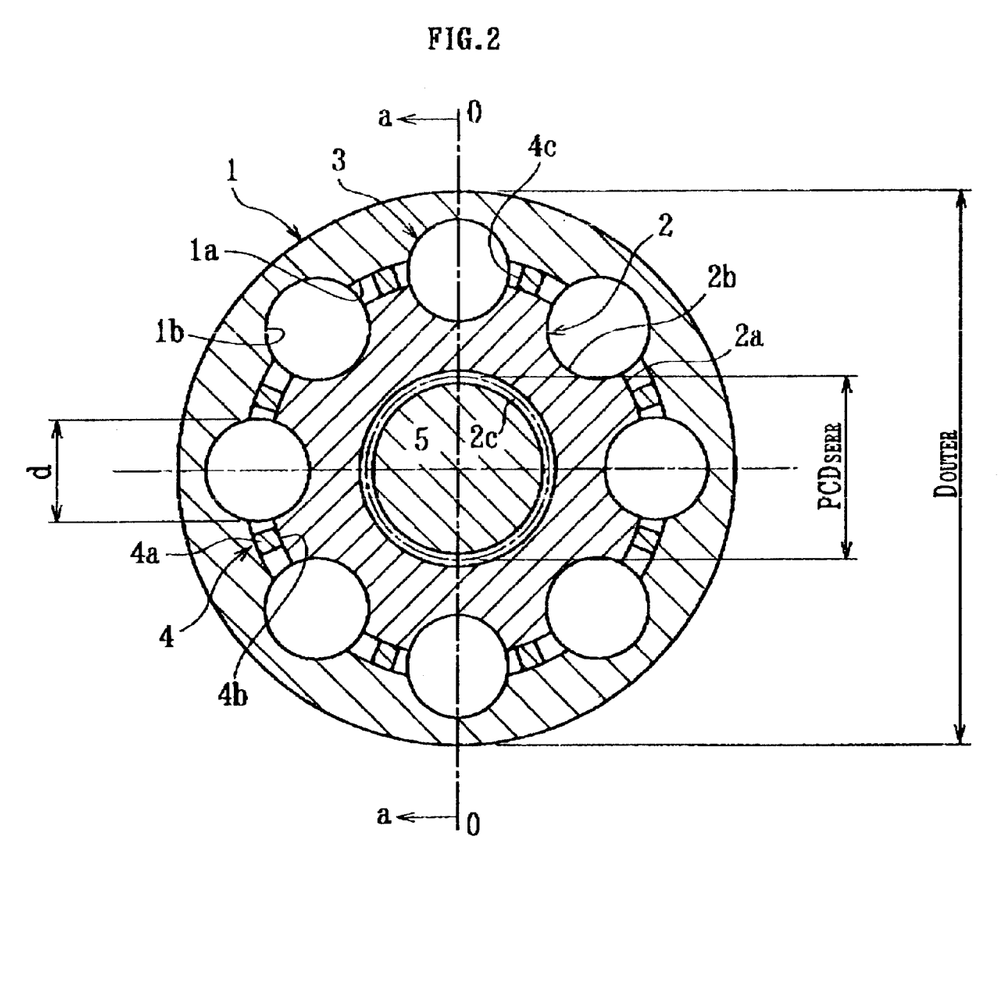
FIG. 2 is a cross sectional view of the constant velocity universal joint in accordance with the first embodiment of the present invention.

FIGS. 1 and 2 are views showing a ball fixed type constant velocity universal joint in accordance with a first embodiment of the present invention. The constant velocity universal joint of the present embodiment includes an outer joint member 1 having a spherical inner surface 1a axially formed with eight curved guide grooves 1b, an inner joint member 2 having a spherical outer surface 2a axially formed with eight curved guide grooves 2b and an inner surface formed with a fitting portion 2c having a tooth profile (serrations or splines), eight torque transmitting balls 3 disposed in eight ball tracks defined between the guide grooves 1b in the outer joint member 1 and the guide grooves 2b in the inner joint member 2 corresponding thereto, and a cage 4 for retaining the torque transmitting balls 3. The fitting portion 2c in the inner joint member 2 is fitted to an axis end portion of a drive shaft of an automobile by its tooth profile (serration fitting or spline fitting), for example.

The centers O1 and O2 of the guide grooves 1b and 2b in the outer and inner joint members 1 and 2, respectively, are offset axially with respect to the spherical centers of the inner and outer surfaces 1a and 2a, respectively, by an equal distance F in opposite directions (in case of the example shown in FIG. 1, the center O1 is offset toward the open side of the joint, and the center O2 toward the inner side of the joint). As a result, the ball tracks defined between the guide grooves 1b and the guide grooves 2b corresponding thereto are wedge-wise enlarged toward one sense of the axial direction (in case of the example shown in the drawing, toward the open side of the joint).

Both the spherical center of the outer surface 4a of the cage 4 and the spherical center of the inner surface 1a of the outer joint member 1 that serves as a guide surface for the outer surface 4a of the cage 4 are located in the joint center plane O including the centers O3 of the torque transmitting balls 3. Also, both the spherical center of the inner surface 4b of the cage 4 and the spherical center of the outer surface 2a of the inner joint member 2 that serves as a guide surface for the inner surface 4b of the cage 4 are located in the joint center plane O. Hence, an amount F of the offset at the center O1 of the guide grooves 1b is equal to an axial distance between the center o1 and the joint center plane O, and an amount F of the offset at the center O2 of the guide grooves 2b is equal to an axial distance between the center O2 and the joint center plane O, and hence both the amounts F of the offset are equal. In the present embodiment, the amount F of the offset at each of the centers O1 and O2 is 2 to 4 mm.

For the reason described above, the ratio r1 (=$PCD_{BALL}$/d) of the pitch circle diameter ($PCD_{BALL}$) of the torque transmitting balls to the diameter (d) thereof is set within a range 3.3 r1 5.0, and more preferably 3.5 r1 5.0, Here, the pitch circle diameter ($PCD_{BALL}$) of the torque transmitting balls is twice the PCR ($PCD_{BALL}$=2×PCR). The length of a line segment linking the center O1 of the guide grooves 1b in the outer joint member 1 and the centers O3 of the torque transmitting balls 3, and the length of a line segment connecting the center O2 of the guide grooves 2b in the inner joint member 2 and the centers O3 of the torque transmitting balls 3 are each equal to PCR, and thus the two lengths are equal. In addition, a ratio r2 (=$D_{outer}$/$PCD_{SERR}$) of the outer diameter ($D_{outer}$) of the outer joint member 1 to the pitch circle diameter ($PCD_{SERR}$) of the tooth profile (serrations or splines) of the fitting portion 2c in the inner joint member 2 is set within a range 2.5 r2<3.5. The reason why is as follows. That is, the pitch circle diameter ($PCD_{SERR}$) of the tooth profile of the fitting portion 2c in the inner joint member 2 cannot be changed drastically because of the relation to the strength of the drive shaft 5 or the like. Therefore, a value of r2 mainly depends on the outer diameter ($D_{outer}$) of the outer joint member 1. When r2<2.5 (mainly when the outer diameter $D_{outer}$ is small), each component (outer joint member, inner joint member, etc.) would be too thin, and concerns are raised as to the strength. On the other hand, when r2≧3.5 (mainly when the outer diameter $D_{outer}$ is large), the object of making the joint compact could not be achieved. Hence, by setting r2 within a range 2.5 r2<3.5, it is possible to realize a compact outer dimension while maintaining the strength of the outer joint member or the like and durability of the joint at least as high as those of the conventional joint (6-ball fixed type constant velocity universal joint).

The constant velocity universal joint of the present embodiment has eight torque transmitting balls 3, and compared with the conventional joint (6-ball fixed type constant velocity universal joint), a ratio of the load supported by one torque transmitting ball to the entire load capacity on the joint is small. Hence, it is possible to reduce the diameter (d) of the torque transmitting balls 3 compared with the conventional joint of the same nominal size, and make the respective thicknesses of the outer joint member 1 and inner joint member 2 substantially equal to those of the conventional joint (6-ball fixed type constant velocity universal joint). Also, it is possible to make the outer dimension ($D_{outer}$) more compact compared with the conventional joint of the same nominal size (6-ball fixed type constant velocity universal joint) by reducing the ratio r2 (=$D_{outer}$/$PCD_{SERR}$) while maintaining the strength, load capacity, and durability at least as high as those of the conventional joint (6-ball fixed type constant velocity universal joint). For example, when the pitch circle diameter ($PCD_{SERR}$) of the fitting portion 2c is made equal to that of the conventional joint (6-ball fixed type constant velocity universal joint), the outer diameter ($D_{outer}$) can be downsized. In addition, it has been confirmed from the test result that the joint of the present embodiment yields less heat compared with the conventional joint (6-ball fixed type constant velocity universal joint).

Each of the outer joint member 1 and inner joint member 2 is preformed out of steel materials into a predetermined shape by means of hot forging or sub-hot forging, and finished with cold forging or grinding. It has been confirmed froal the test result that the constant velocity universal joint of the present embodiment has a small torque loss and yields less heat, and therefore, if a degree of accuracy is lowered for the finished surface, the resulting rise in temperature has less effect upon shortening of the service life compared with the conventional joint (6-ball fixed type constant velocity universal joint). By paying attention to this fact, the guide grooves 1b and inner surface 1a of the outer joint member 1 can be formed as a surface finished with the cold forging (without grinding), and the guide grooves 2b and outer surface 2a of the inner joint member 2 can be formed as a surface finished with the cold forging (without grinding). Consequently, the manufacturing procedure can be simplified, and hence, the manufacturing cost can be saved.

According to the above arrangement, when the outer joint member 1 and inner joint member 2 make an angular displacement of an angle θ, the torque transmitting balls 3 guided by the cage 4 are maintained in the bisector plane (θ/2) bisecting the angle θ at any operating angle θ, so that uniform velocity for the joint is secured.

Figure 3A:
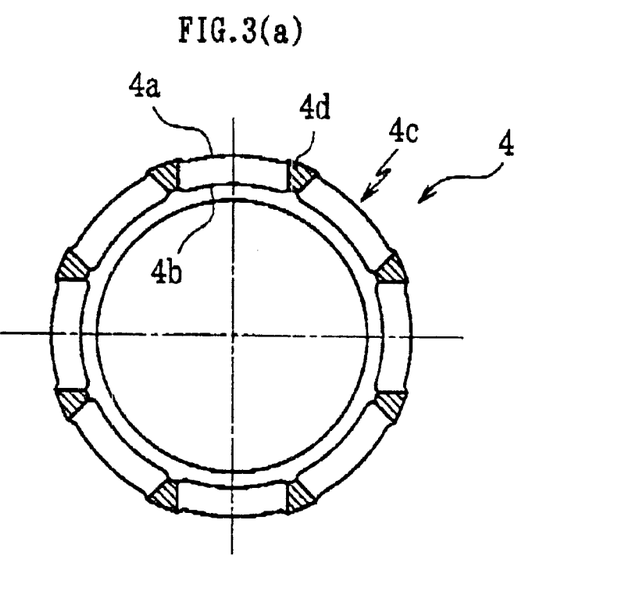
FIGS. 3(a) is a front view of a cage.
Figure 3B:
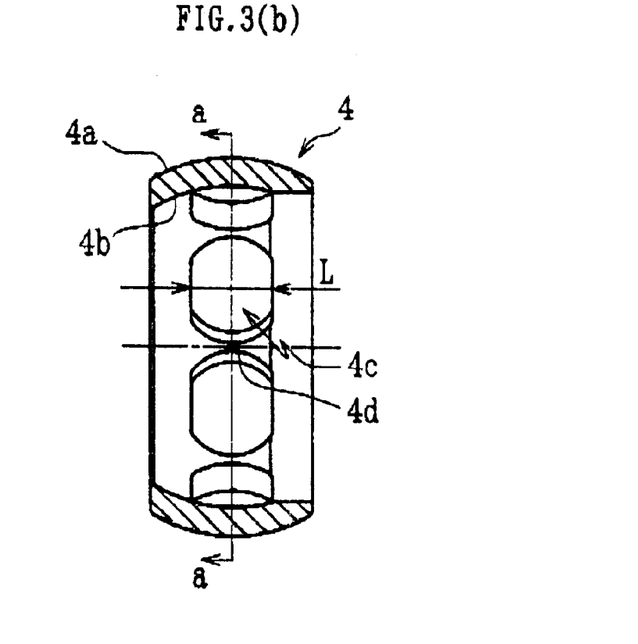
FIG. 3(b) is a longitudinal sectional view of the same.

FIGS. 3(a) and 3(b) are views showing the cage 4. The cage 4 is provided with eight window-like pockets 4c that hold and retain the torque transmitting balls 3, and column portions 4d between the circumferentially adjacent pockets 4c. A difference (=L–d) of the axial dimension L of the pockets 4c and the diameter d of the torque transmitting balls 3 at the initial running of the joint, that is, the axial initial clearance therebetween is controlled so as to be within a range −30 to +10 μm, and more preferably within a range −10 to +10 μm. The eight pockets 4c may include first pockets and second pockets having different circumferential lengths from each other, and the first pockets having the shorter circumferential length may be provided at the angular spacing of 90° or 180°.

The cage 4 is made of carburized steel, for example, and is provided with a carburized layer as the surface layer by means of carburized hardening and tempering. Examples of the carburized steel includes chrome steel, chrome molybdenum steel, nickel chrome molybdenum steel, etc. In the present embodiment, chrome molybdenum steel SCM4153 is used. The surface hardness of the carburized layer is HRC58 to 63, and the hardness of the core portion (portion other than the carburized layer) is HRC35 to 45. The area ratio of the core portion to the entire area in a certain cross section of the cage 4, in particular, in the cross section of the column portions 4d, is 40 to 55%.

A depth of wear of the pockets of the cage was found by using the constant velocity universal joint of the first embodiment discussed above. In the test, a test joint was run under the following conditions: load torque T=412N·m, number of revolutions N=1300 rpm, and operating angle θ=6°, and then a depth of wear on the axial wall surfaces of the pockets 4c was measured after 200 hours, 450 hours, and 650 hours, respectively. The measurement result is set forth in FIG. 4. The test was conducted with two test joints (No. 1: ○, No. 2; △), and the mean value of multiple measurements for each is deemed as the depth of wear.

Figure 4:
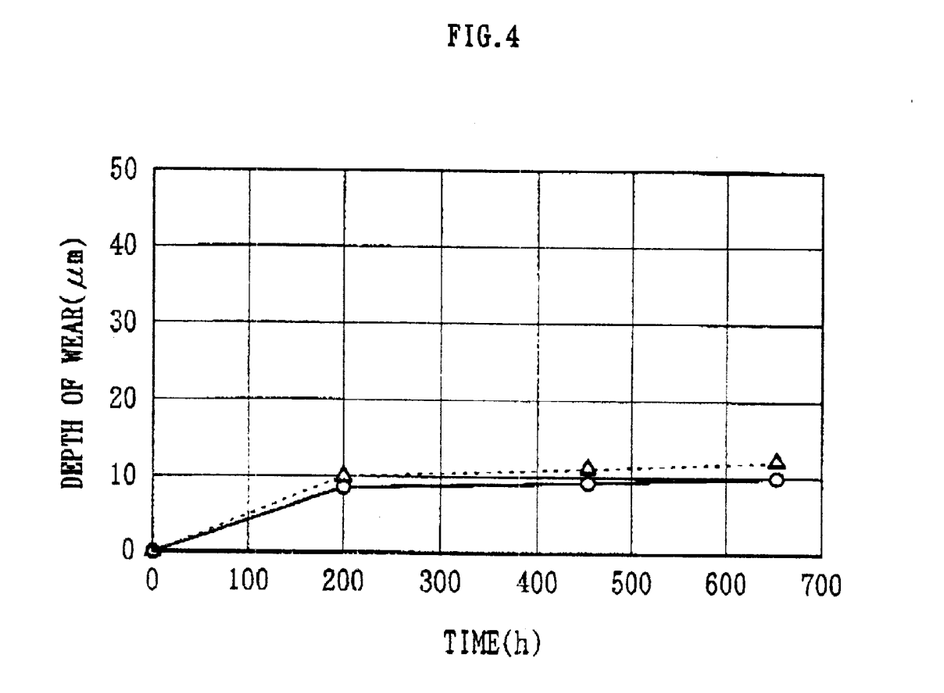
FIG. 4 is a graph showing a test result as to a depth of wear of pockets of the cage.

The result in FIG. 4 reveals that the depth of wear increases abruptly up to 200 hours, which means the occurrence of initial wear, and after 200 hours, the depth of wear did not change substantially, which means the occurrence of wear was stabilized. Also, the depths of wear after running the joints 650 hours were 10.0 μm and 11.9 μm for the test joints No. 1 and No. 2, respectively. Thus, it was confirmed that, compared with the conventional joint (6-ball fixed type constant velocity universal joint), the depth of wear can be reduced by approximately 20 μm. Hence, even when a range of the axial initial clearance between the pockets of the cage and torque transmitting balls is shifted to the plus side by 20 μm to a range −30 to +10 μm from the range of the conventional joint (6-ball fixed type constant velocity universal joint), the clearance will never become a too large positive clearance during the use, thereby making it possible to secure the function of the joint. Also, by shifting a value of the axial initial clearance toward the plus side, a force of constraint on the torque transmitting balls by the pockets of the cage can be lessened, which makes it possible to secure the smooth rolling movement of the torque transmitting balls.

Figure 5:
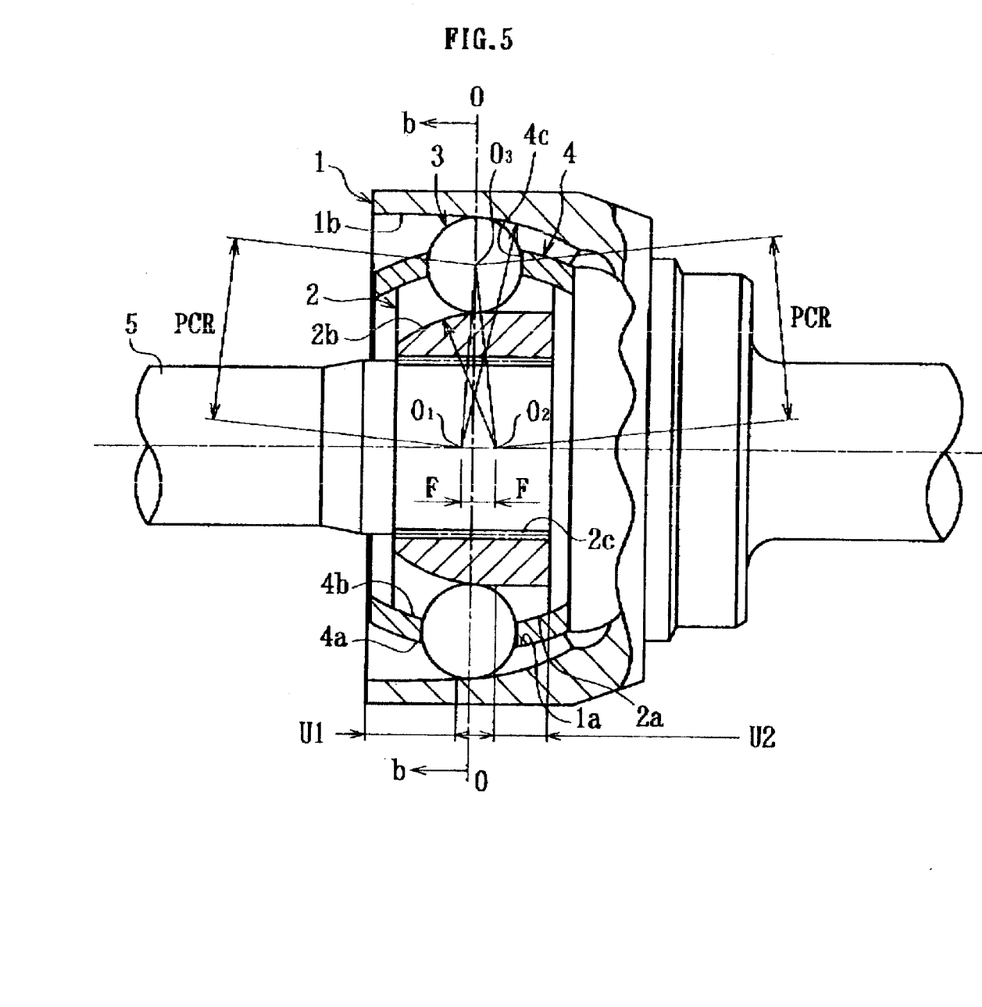
FIG. 5 is a longitudinal sectional view of a constant velocity universal joint in accordance with a second embodiment of the present invention.

FIG. 5 is a view showing a constant velocity universal joint in accordance with a second embodiment of the present invention. The constant velocity universal joint of the present embodiment differs from the counterpart in the first embodiment described above in that the guide grooves 1b in the outer joint member 1 and the guide grooves 2b in the inner joint member 2 are provided with straight portions U1 and U2 having linear groove bottoms, respectively. By providing the straight portions U1 and U2 to the guide grooves 1b in the outer joint member U1 and the guide grooves 2b in the inner joint member 2, respectively, the constant velocity universal joint of the present embodiment can increase the greatest operating angle compared with the counterpart in the first embodiment described above.

Figure 6:
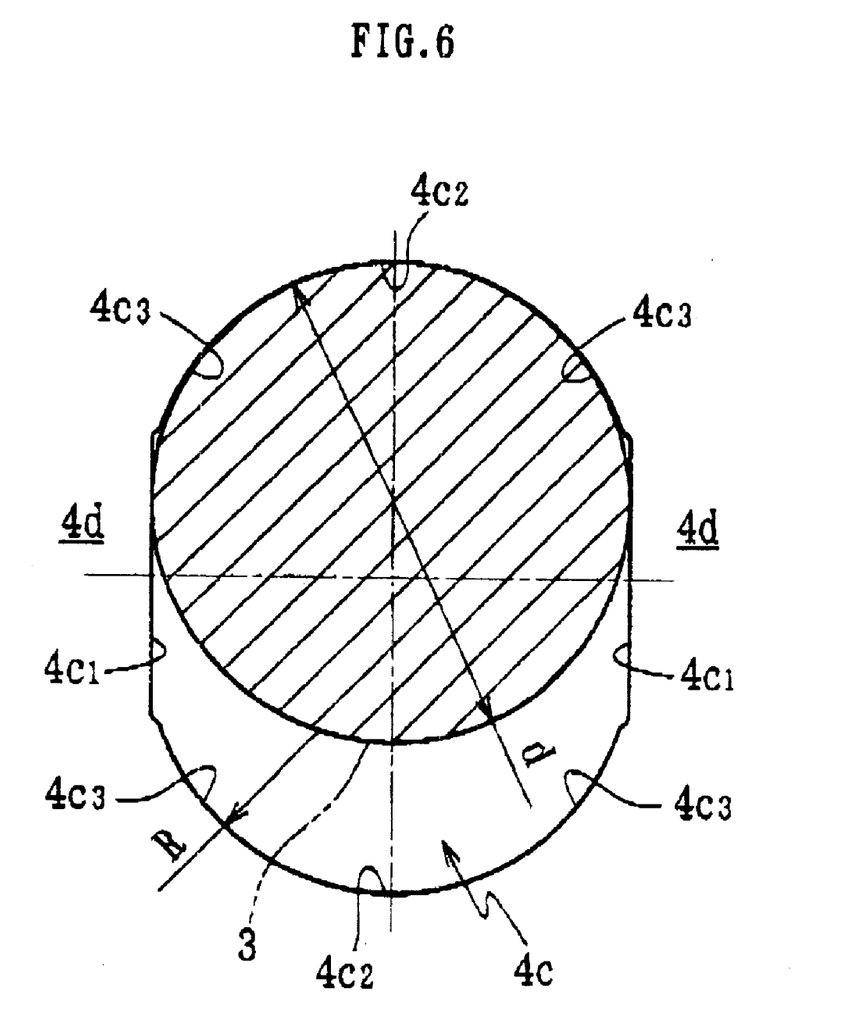
FIG. 6 is an enlarged plan view showing a peripheral portion of each pocket of the cage.

In the constant velocity universal joint shown in FIGS. 1 and 2, or FIG. 5, as shown in an enlargement view of FIG. 6, each pocket 4c of the cage 4 can be composed of a pair of axial wall surfaces 4c1 opposing each other along the axial line of the cage 4, a pair of circumferential wall surfaces 4c2 opposing each other along the circumference direction of the cage 4, and radii 4c3 linking the axial wall surfaces 4c1 and circumferential wall surface 4c2. In the present embodiment, a ratio (R/d) of the radius of curvature R of the radii 4c3 to the diameter d of the torque transmitting balls 3 is set within a range 0.45 R/d 0.62, and R/d=0.537 is given in the example shown in the drawing. Also, the circumferential wall surfaces 4c2 and radii 4c3 are shaped along an arc having the radius of curvature R. Further, as to the axial wall surfaces 4c1, variance in the treatment margin is lessened by applying the grinding, hardened steel cutting, or the like after the heat treatment (carburized hardening and tempering) is applied to the cage 4 (the circumference wall surfaces 4c2 and radii 4c3 are left intact after the punching press). According to the present embodiment, it is possible to optimize the pocket structure without impairing the function of the cage, and as a consequence, the strength and durability of the cage, and hence the strength and durability of the joint can be improved.

Figure 8A:
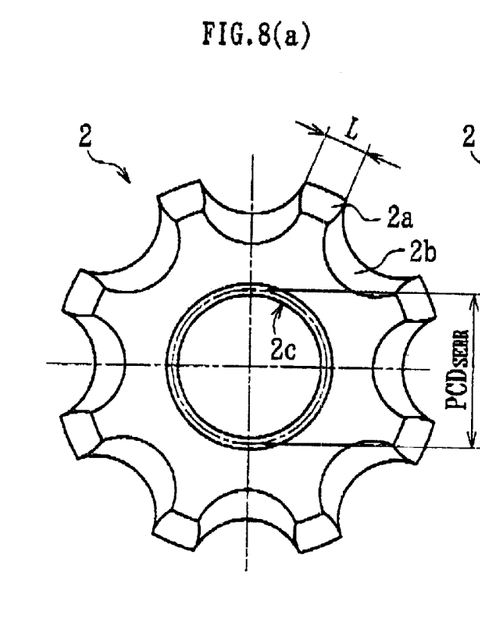
FIG. 8(a) is a front view of an inner joint member.
Figure 8B:
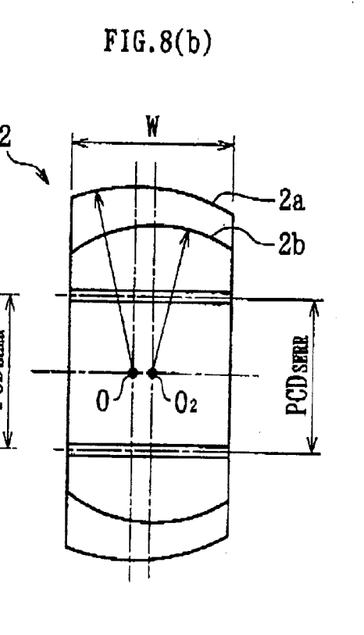
FIG. 8(b) is a longitudinal sectional view of the same.

In the constant velocity universal joint shown in FIGS. 1 and 2, the inner joint member 2 can be arranged as shown in FIGS. 8(a) and 8(b) and FIGS. 9(a) and 9(b). As shown in FIGS. 8(a) and 8(b), the guide grooves 2b in the inner joint member 2 are preformed out of the steel materials into a predetermined shape by means of hot forging or sub-hot forging, and finished with the cold forging or grinding.

The circumferential width (L) of the outer surface 2a of the inner joint member 2 is L 3.5 mm, and the axial width (W) thereof is set such that, given 47° as the greatest operating angle, then a ratio R/w (=W/PCR) to the length (PCR: see FIG. 9(b)) of the line segment linking the center O2 of the guide grooves 2b and the centers O3 of the torque transmitting balls 3 is within a range 0.69 Rw 0.84. Consequently, even when the joint takes the greatest operating angle of 47°, the contacting oval of the torque transmitting balls 3 and guide grooves 2b will not go beyond the grooves 2b. Thus, the strength and durability of the inner joint member 2, and hence the strength, durability, load capacity, and high angularity of the joint can be secured. At the same time, by improving the forging property of the inner joint member 2, the treatment cost can be saved, and by reducing the axial width (W) as small as possible, the weight, axial dimension, material costs of the joint can be reduced.

Further, because the axial width (W) of the inner joint member 2 is set within a range 0.69 Rw 0.84, compared with the constant velocity universal joint (8-ball fixed type constant velocity universal joint) that has been already proposed, the axial dimension of the inner joint member 2 can be made more compact, so that the weight and cost of the joint can be reduced further.

Alternatively, in the constant velocity universal joint shown in FIG. 5, the inner joint member 2 can be arranged as discussed above. By providing the constant velocity universal joint shown in FIG. 5 with the straight portions U1 and U2 in the guide grooves 1b in the outer joint member 1 and the guide grooves 2b in the inner joint member 2, respectively, the greatest operating angle can be increased compared with that of the constant velocity universal joint shown in FIGS. 1 and 2. Hence, from the viewpoint of achieving the high angularity of the joint, an angle of 50° is given as the greatest operating angle used as the reference when determining the smallest value of Rw. The guide grooves 2b in the inner joint member 2 are preformed out of the steel materials into a predetermined shape by means of hot forging or sub-hot forging, and finished with the cool forging or grinding.

While there has been described what are at present considered to be preferred embodiments of the invention, it will be understood that various modifications may be made thereto, and it is intended that the appended claims cover all such modifications as fall within the true spirit and scope of the invention.

What is claimed is:
1. A constant velocity universal joint comprising:
an outer joint member having eight axially extending curved guide grooves formed in a spherical inner surface thereof;
an inner joint member having eight axially extending curved guide grooves formed in a spherical outer surface thereof;
eight torque transmitting balls disposed in eight ball tracks defined between the guide grooves in said outer joint member and the guide grooves in said inner joint member corresponding thereto; and
a cage having pockets for retaining said torque transmitting balls,
respective centers of the guide grooves in said outer and inner joint members, respectively, being offset axially with respect to respective spherical centers of said inner and outer surfaces by an equal distance (F) in opposite directions,
wherein an axial initial clearance between the pockets of said cage and said torque transmitting balls is within a range −30 to +10 $\mu$m.
2. A constant velocity universal joint comprising:
an outer joint member having eight axially extending curved guide grooves formed in a spherical inner surface thereof;
an inner joint meber having eight axially extending curved guide grooves formed in a spherical outer surface thereof;
eight torque transmitting balls disposed in eight ball tracks defined between the guide grooves in said outer joint member and the guide grooves in said inner joint member corresponding thereto; and
a cage having pockets for retaining said torque transmitting balls,
respective centers of the guide grooves in said outer and inner joint members, respectively, being offset axially with respect to respective spherical centers of said inner and outer surfaces by an equal distance (F) in opposite directions,
each of the guide grooves in said outer and inner joint members being provided with a straight portion having a linear groove bottom,
wherein an axial initial clearance between the pockets of said cage and said torque transmitting balls is within a range −30 to +10 $\mu$m.

TABLE 1

| Diameter of ball (d) | 0.537 d | R dimension Upper limit value | R dimension Lower limit value | R/d Upper limit value | R/d Median value | R/d Lower limit value |
|---|---|---|---|---|---|---|
| 12.7 | 6.8 | 5.8 | 5.8 | 0.614 | 0.535 | 0.457 |
| 14.287 | 7.7 | 6.7 | 6.7 | 0.609 | 0.539 | 0.469 |
| 15.081 | 8.1 | 7.1 | 7.1 | 0.603 | 0.537 | 0.471 |
| 15.875 | 8.5 | 7.5 | 7.5 | 0.598 | 0.535 | 0.472 |
| 16.669 | 9 | 8 | 8 | 0.6 | 0.54 | 0.48 |
| 17.462 | 9.4 | 8.4 | 8.4 | 0.596 | 0.538 | 0.481 |
| 18 | 9.7 | 8.7 | 8.7 | 0.594 | 0.539 | 0.483 |
| 19.05 | 10.2 | 9.2 | 9.2 | 0.588 | 0.535 | 0.483 |
| 19.844 | 10.7 | 9.7 | 9.7 | 0.59 | 0.539 | 0.489 |
| 20.638 | 11.1 | 10.1 | 10.1 | 0.586 | 0.538 | 0.489 |
| 23.812 | 12.8 | 11.8 | 11.8 | 0.58 | 0.538 | 0.496 |
| | | | | 0.58–0.614 | 0.535–0.54 | 0.457–0.496 |

3. The constant velocity universal joint according to claim 1 or 2, wherein:
   said cage includes a surface hardened layer and a core portion; and
   said surface hardened layer has a surface hardness of HRC58 to 63, and said core portion has a hardness of HRC35 to 45.

4. The constant velocity universal joint according to claim 3, wherein said surface hardened layer is a carburized layer.

5. The constant velocity universal joint according to claim 3, wherein, at least in a cross section of column portions positioned between the pockets of said cage, an area ratio of said core portion to an entire area is 40 to 55%.

6. The constant velocity universal joint according to claim 1 or 2, wherein an amount (F) of said offset is 2 to 4 mm.

7. A constant velocity universal joint comprising:
   an outer joint member having eight axially extending curved guide grooves formed in a spherical inner surface thereof;
   an inner joint member having eight axially extending curved guide grooves formed in a spherical outer surface thereof;
   eight torque transmitting balls disposed in eight ball tracks defined between the guide grooves in said outer joint member and the guide grooves in said inner joint member corresponding thereto; and
   a cage having eight window-like pockets for retaining said torque transmitting balls,
   said ball tracks being wedge-wise enlarged toward one sense of an axial direction,
   wherein each of the pockets of said cage includes radii, and given R as a radius of curvature of said radii, and d as a diameter of said torque transmitting balls, then a ratio (R/d) is R/d≧0.22.

8. A constant velocity universal joint comprising:
   an outer joint member having eight axially extending curved guide grooves formed in a spherical inner surface thereof;
   an inner joint member having eight axially extending curved guide grooves formed in a spherical outer surface thereof;
   eight torque transmitting balls disposed in eight ball tracks defined between the guide grooves in said outer joint member and the guide grooves in said inner joint member corresponding thereto; and
   a cage having eight window-like pockets for retaining said torque transmitting balls,
   said ball tracks being wedge-wise enlarged toward one sense of an axial direction,
   each of the guide grooves in said outer and inner joint members being provided with a straight portion having a linear groove bottom,
   wherein each of the pockets of said cage includes radii, and given R as a radius of curvature of said radii, and d as a diameter of said torque transmitting balls, then a ratio (R/d) is R/d≧0.22.

9. The constant velocity universal joint according to claim 7 or 8, wherein said ratio (R/d) is within a range 0.45 R/d 0.62.

10. The constant velocity universal joint according to claim 7 or 8, wherein the eight pockets of said cage are composed of first pockets and second pockets having different circumferential lengths from each other, and the first pockets having a shorter circumferential length are spaced apart from each other at a distance of one of 90° and 180°.

11. The constant velocity universal joint according to claim 7 or 8, wherein a same circumferential length is given to all of the eight pockets of said cage.

12. The constant velocity universal joint according to claim 7 or 8, wherein, of all wall surfaces of each pocket of said cage, at least a pair of axial wall surfaces opposing each other along an axial line of said cage are formed by means of cutting after heat treatment is applied to said cage.

13. A constant velocity universal joint comprising:
   an outer joint member having eight axially extending curved guide grooves formed in a spherical inner surface thereof;
   an inner joint member having eight axially extending curved guide grooves formed in a spherical outer surface thereof, and a fitting portion formed with a tooth profile in an inner surface thereof to be fitted to an axis portion by said tooth profile thereof;
   eight torque transmitting balls disposed in eight ball tracks defined between the guide grooves in said outer joint member and the guide grooves in said inner joint member corresponding thereto; and
   a cage for retaining said torque transmitting balls,
   wherein:
   said ball tracks are wedge-wise enlarged toward one sense of an axial direction; and
   given W as an axial width of said inner joint member, and PCR as a length of a line segment linking a center of the guide grooves in said inner joint member and centers of said torque transmitting balls, then a ratio Rw (=W/PCR) is within a range 0.69 Rw 0.84.

14. The constant velocity universal joint according to claim 13, wherein a greatest operating angle is 47°.

15. A constant velocity universal joint comprising:
   an outer joint member having eight axially extending curved guide grooves formed in a spherical inner surface thereof;
   an inner joint member having eight axially extending curved guide grooves formed in a spherical outer surface thereof, and a fitting portion formed with a tooth profile in an inner surface thereof to be fitted to an axis portion by said tooth profile thereof;
   eight torque transmitting balls disposed in eight ball tracks defined between the guide grooves in said outer joint member and the guide grooves in said inner joint member corresponding thereto; and
   a cage for retaining said torque transmitting balls,
   wherein:
   said ball tracks are wedge-wise enlarged toward one sense of an axial direction;
   each of the guide grooves in said outer and inner joint members is provided with a straight portion having a linear groove bottom; and
   given W as an axial width of said inner joint member, and PCR as a length of a line segment linking a center of the guide grooves in said inner joint member and centers of said torque transmitting balls, then a ratio Rw (=W/PCR) is within a range 0.80 Rw 0.93.

16. The constant velocity universal joint according to claim 15, wherein a greatest operating angle is 50°.

17. The constant velocity universal joint according to claim 13 or 15, wherein the guide grooves in said inner joint member are formed by means of cold forging.

18. The constant velocity universal joint according to claim 13 or 15, wherein, given $PCD_{BALL}$ as a pitch circle diameter of said torque transmitting balls and d as a diameter thereof, then a ratio r1 (=$PCD_{BALL}$/d) is within a range 3.3 r1 5.0.

* * * * *